United States Patent [19]
Dickman et al.

[11] 3,787,345
[45] Jan. 22, 1974

[54] STICK FOR THE APPLICATION OF ADHESIVE TO SUBSTRATES

[75] Inventors: Heinz Hermann Dickman, Buehl/Baden; Richard Krattner, Neusatz/Baden, both of Germany; Hans-Dieter Möbius, deceased, late of Buehl/Baden, Germany by Isolde Möbius nee Diehnelt, executor

[73] Assignee: UHU-Werk H.u.M. Fischer G.m.b.H., Buehl/Baden, Germany

[22] Filed: Oct. 26, 1971

[21] Appl. No.: 192,340

[30] Foreign Application Priority Data
Nov. 5, 1970  Germany............................ 2054503

[52] U.S. Cl............. 260/28.5 R, 106/201, 106/207, 106/212, 106/216, 106/230, 117/122 PA, 260/28, 260/28.5 D

[51] Int. Cl.....................C08f 45/36, C08g 51/36
[58] Field of Search ... 106/271, 131, 134, 142, 145, 106/171, 191, 199; 260/28, 23 AR, 23 S, 23 AC, 28.5 R; 117/122 PA; 424/64

[56] References Cited
UNITED STATES PATENTS

| | | | |
|---|---|---|---|
| 3,088,876 | 5/1963 | Buth | 106/231 |
| 3,148,125 | 9/1964 | Strianse | 424/64 |
| 2,873,229 | 2/1959 | Wick | 424/64 |
| 3,417,054 | 12/1968 | Merijan | 260/33.2 R |
| 3,576,776 | 4/1971 | Muszik | 260/29.6 R |
| 3,539,481 | 11/1970 | Parker | 260/27 |
| 3,267,052 | 8/1966 | Brennan | 260/5 |

OTHER PUBLICATIONS

A. H. Warth, "The Chemistry and Technology of Waxes," 2nd edition, Reinhold Pub. Co. New York, 1956, pp. 457–463.

Primary Examiner—Morris Liebman
Assistant Examiner—P. R. Michl
Attorney, Agent, or Firm—Jacobs & Jacobs

[57] ABSTRACT

Gluestick adhesive compositions for adhesively securing together two substrates comprise a solution or dispersion of an adhesive of N-vinyl-pyrrolidone polymer or co-polymer and wax acids, or esters of such acids with alcohols having one to eight carbon atoms, in sufficient amount for the composition to be moulded in stick form as a self-supporting gel.

6 Claims, No Drawings

STICK FOR THE APPLICATION OF ADHESIVE TO SUBSTRATES

The invention relates to a stick for the application of adhesive to substrates, which consists essentially of an adhesive dissolved or dispersed in a solvent intimately admixed with sufficient structuring substance to produce a self-supporting adhesive composition.

It is known that adhesive sticks can be produced from rubber, resins and waxes. In order to effect adhesion, surface layers must be rubbed off from these adhesive sticks under pressure. As a result of the pressure, a fracture may thereby occur, or in the case of a structuring substance of softer consistency, a deformation of the stick itself, or damage of the parts to be joined together as, for example, with thin paper.

It is further known that self-supporting adhesive sticks can be formed from alkali-metal salts of aliphatic carboxylic acids, water or water-miscible organic solvents and water-soluble or water-dispersible adhesive materials, but the adhesive sticks obtained also exhibit the drawbacks described in the preceding paragraph, though to a minor extent. However these latter-mentioned adhesive sticks suffer primarily from the disadvantages: firstly that no alkali-sensitive substances may be employed for their production, and secondly that no acid-reacting active components may be added, because these would naturally destroy the gel-like supporting structure of the stick. These disadvantages result in a limitation of components capable of inclusion in these sticks.

The present invention has the object of producing adhesive sticks, employing an alternative structuring substance, which permits an appreciably improved, extremely light rubbing-off on to the substrates to be glued together, thereby exhibiting an excellent shape stability, and the use of an adhesive formulation which is in the acid pH range. We have found that the use as structuring substance of free long chain aliphatic carboxylic acids having an average from 24 to 50 carbon atoms, or of esters of such acids with alcohols having from one to eight carbon atoms, enables the object of the invention to be achieved.

Accordingly, the invention provides a gluestick for the application of adhesive material to substrates to be adhesively secured together, which stick consists essentially of an adhesive dissolved or dispersed in a solvent intimately admixed with sufficient of a shape-conferring structuring substance to produce a self-supporting adhesive composition, characterized in that one or more aliphatic carboxylic acids having on average from 24 to 50 carbon atoms, or esters of such acids with alcohols having from one to eight carbon atoms, are employed as structuring substance.

The essential structuring substance for the adhesive gluesticks of the invention are preferably free long chain aliphatic carboxylic acids. Normally a mixture of such acids as derived from natural or mineral sources will be employed, for example those obtained by oxidation of high molecular weight aliphatic hydrocarbons. Such mixtures are used that have an average carbon number of from 24–50. Particularly preferred are the so-called wax acids obtained by the oxidation of mineral or petroleum waxes, for example from peat wax, montan wax (which is extracted from lignite) or from ozokerite. The oxidation is normally carried out using hot chromic/sulphuric acid solutions and the product is a mixture of acids having from 19 to 50 carbon atoms with an average carbon number of from 24 to 33. Such acids are mainly aliphatic and may be saturated or unsaturated, mono- or di-carboxylic acids; examples include montanic acid and cerotinic acid. Some alicyclic acids may also be present in such mixtures in small amounts. Very suitable wax acids for present purposes are those sold by Farbwerke Hoechst A.G. as "Hoechst Waxes S, L and LP."

Also as structuring substances for the adhesive compositions of the invention there can be used, either alone or together with the aforesaid free acids, esters of such acids with lower straight chain or branched monohydric or dihydric alcohols having from one to eight carbon atoms. Preferably such esters are those formed from the wax acids and lower polyhydric alcohols such as ethylene glycol, diethylene glycol or triethylene glycol. Suitable wax acid esters derived from montan wax are also sold by Farbwerke Hoechst A.G. under the generic trade name of "Hoechst Waxes." Included within the category of wax acid esters for present purposes are the partly saponified wax acid esters which contain some of the wax acid in a salt, rather than ester, form. However, it is preferred for present purposes to use as structuring substance a mixture of acids which is in the free acid form, rather than that of an ester and/or salt derivative thereof. Preferably such mixture has an average number of from 28 to 36 carbon atoms.

There may also be employed as additional structuring agents polyalkylene glycols and their derivatives. For example the compositions of the invention can additionally comprise minor amounts of polyethylene glycols, polypropylene glycols, ethylene oxide and propylene oxide adducts of fatty acids ($C_{10}$ to $C_{22}$, saturated and unsaturated) and/or of wax acids and/or of fatty alcohols ($C_{10}$ to $C_{22}$) and/or of fatty acid esters of polyalcohols (such as e.g. sorbitol) and/or of fatty acid amides. The fatty acids and fatty alcohols may be of natural or synthetic origin.

In the production of the adhesive sticks of the invention the structuring agent is normally dissolved or dispersed in a volatile liquid which may be water or a solvent which is water-miscible or water immiscible with or without addition of water. Preferably water-miscible organic solvents are used. As suitable volatile liquids there may be mentioned lower monovalent alcohols, as e.g. methanol, ethanol, isopropanol and n-propanol as well as esters, ketones, ethers and others such as, for example, methyl ethyl ketone. Preferably these are used together with water.

As film-forming component for the adhesive sticks of the invention, there is used an adhesive substance soluble or dispersible in the chosen solvent.

The preferred adhesive is polyvinylpyrrolidone, but there may also be used polyvinyl oxazolidone, polyvinyl acetate or copolymers of vinyl acetate with vinyl alcohol, vinyl chloride, vinyl butyrate or vinyl laurate. Other polymers include the adhesive polymers formed from methacrylate and/or acrylate esters; acrylamide; methacrylamide; vinyl chloride and vinylidene chlorides. Also as adhesive there may be employed alkyd resins. Natural carbohydrate polymers or modified carbohydrate polymers, such as starch, dextrin, gum arabic, cellulose, methyl cellulose, cellulose esters or carboxymethylcellulose may also be employed. Mixtures of adhesives may be used, if desired. It is particularly preferred to employ polyvinylpyrrolidone as sold under the trade name Luviskol K.90, especially in conjuction with 2 – 6 percent by weight of a carbohydrate or modified carbohydrate polymer.

It is a particular feature of the present invention that adhesives active in the acid range, e.g. resin acids or esters thereof, can be employed, whereas this is not possible in the prior art glue sticks wherein soaps are used as structuring agent. Thus adhesive substances may be used of the carboxyvinyl polymer type with extremely high molecular weight (known under the trade mark of Carbopol) which at higher concentrations jeopardize technical exploitation by strong gel-formation in the alkaline region.

It is also possible to consider the use of such adhesive substances as e.g. alkylphenolic resins, which are soluble e.g. in lower esters, though not in water-miscible organic solvents.

The composition of the adhesive sticks must be so chosen, that a not too soft mass is formed which may be readily rubbed off. This is achieved when the content of the structure forming substance is between 3 and 60 percent, usually from 10 to 40 and preferably from 15 to 30 percent.

The volatile liquid component of the compositions of the invention amounts to about 20 – 80 percent, particularly 30 to 70 percent and the proportion of adhesive components lies somewhere between 5 and 50 percent, usually between 20 and 40 percent. The quoted percentages are percentages by weight and are based on the total weight of the structure forming substances, the liquid and adhesive components.

Other adjuvants that do not inhibit the self-supporting properties of the compositions of the invention can also be present. These include: softening agents, such as non-volatile polyhydric alcohols, for example glycerol, sorbitol, mannitol, ethylene glycol, polyethylene glycols of molecular weight up to 500; and/or waxes, pigments, dyes, fillers and perfumes. The use of up to 25 percent by weight of glycerol or other non-volatile polyhydric alcohol as plasticizer is particularly recommended since this provides the adhesive sticks with light, soft "rub-off" characteristics.

The adhesive sticks of the invention are usually prepared by mixing warm solutions of the adhesive and the structuring substance, stirring the mixtures at 60° – 95°C until homogenous, and allowing the mixture to cool in a mould or after extrusion in the desired shaped form. This form is usually that of a stick which is conveniently mounted in an applicator of the lipstick holder type. In such a holder it may be readily carried among personal possessions or kept in an office desk for use in light glueing applications such as the sticking together of sheets of paper or cardboard or thin layers of flexible plastic materials. The stick can also be placed in a pencil-shaped holder so that it can readily be carried in a person's pocket.

The consistency of the adhesive sticks may be varied within wide limits by the type and quantity of structuring agent, adhesive and other additives. The invention may therefore be easily adapted to various technical application requirements.

The invention is illustrated by the following examples.

The wax acids mixture used in the carrying out of the examples, which was also used for the manufacture of the glycol wax acid esters similarly used, was a commercially available Montan acid containing saturated aliphatic carboxylic acids having 19 to 33 carbon atoms with an average carbon number of from 24 to 33.

Example 1

Polyvinylpyrrolidone (MW approx.700,000) (20g.) was dissolved in isopropanol (62g.) and heated under reflux to about 80°C. The wax acid mixture (18g.) was added into the hot solution which was stirred until a clear homogeneous melt was obtained. This was then cast into sticks by pouring into suitable adhesive stick containers.

Example 2:

Polyvinylpyrrolidone (MW approx. 700,000)(18g.) and a vinylpyrrolidone-vinyl acetate (20:80) copolymer (4g.) were dissolved in a mixture of n-propanol (35g.) and isobutanol (23g.) and heated under reflux. The wax acid mixture (15 g.) and an ester of such mixture with triethylene glycol (5 g.) were added into the hot solution which was stirred until a clear homogeneous melt was obtained. This was then cast into sticks by pouring into suitable adhesive stick cases.

Example 3

A clear melt obtained in a similar way as in Example 2 from the wax acid mixture (40g.) the phthalic acid ester of hydroabietyl alcohol (45g.) polyisobutylene (MW of approx. 1,240) (5g.) and an aliphatic hydrocarbon solvent (10g.) was cast by pouring into suitable adhesive stick cases.

Example 4

A mixture of triethylene glycol wax acids ester (20g.), polyvinylpyrrolidone (molecular weight about 700,000) (25g.), propylene glycol (5g.) and n-propanol(50g.) was heated under reflux and stirred to about 80°C. After about 20 minutes a clear melt developed. The hot liquid was then poured into suitable glue stick moulds and cooled to room temperature.

What is claimed is:

1. A gluestick for adhesively securing together two substrates, which gluestick consists essentially by weight of 5-50% of adhesive of N-vinyl-pyrrolidone polymer or co-polymer dissolved or dispersed in 20–80 percent of a liquid solvent selected from the group consisting of water, lower monovalent alcohol, or mixtures thereof intimately admixed with 3–60 percent of a shape-conferring structuring substance to produce a self-supporting gluestick adhesive composition, said structuring substance being at least one aliphatic carboxylic acid having on average from 24 to 50 carbon atoms, or an ester of such acid with an alcohol having from one to eight carbon atoms.

2. An adhesive gluestick according to claim 1 which comprises from 10-46% of structuring substance, 30 to 70 percent of volatble liquid and 20 to 40 percent of adhesive.

3. An adhesive gluestick according to claim 1, wherein the structuring substance is a mixture of wax acids.

4. An adhesive gluestick according to claim 3, wherein the mixture of wax acids has an average carbon number of from 24 to 33.

5. An adhesive gluestick according to claim 3 which comprises a lower monovalent alcohol as volatile liquid.

6. An adhesive stick according to claim 2 wherein polyvinylpyrrolidone is used as adhesive.

* * * * *